Jan. 31, 1928.
E. J. WIRFS, JR
1,657,733
GASKET
Filed Nov. 8, 1926
Fig. 1.
Fig. 2.
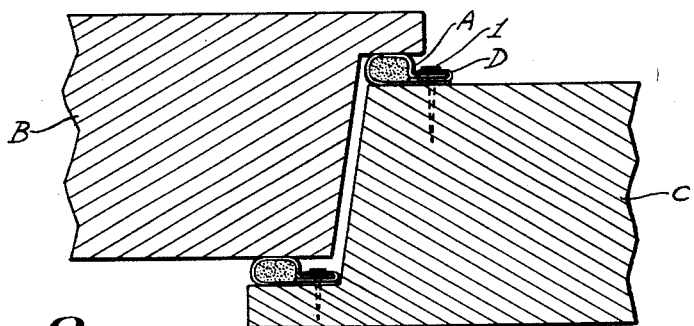
Fig. 4.
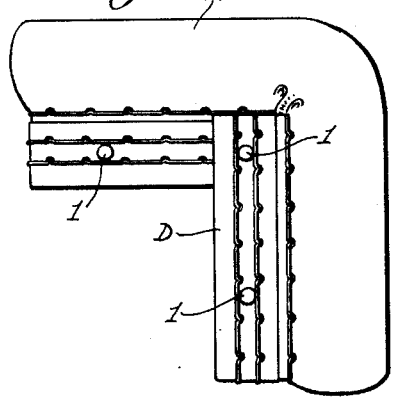
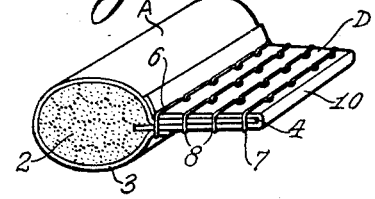
Fig. 3.
Fig. 5.
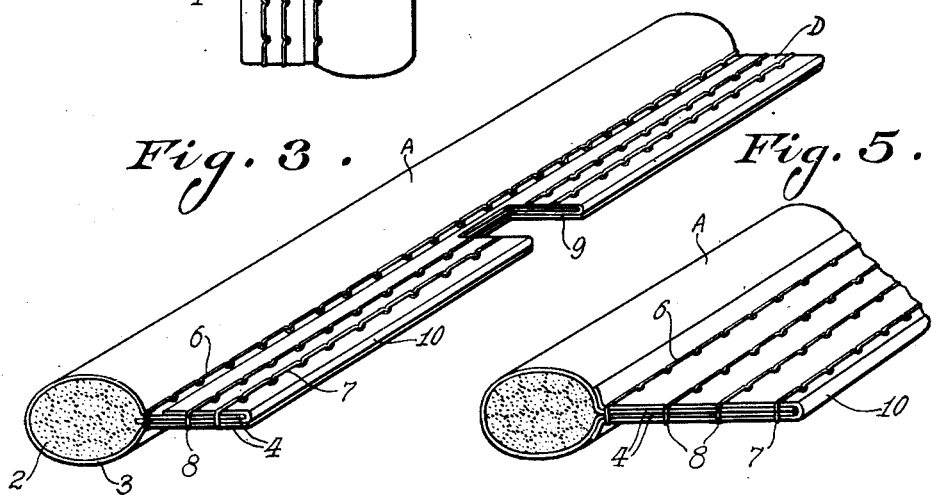
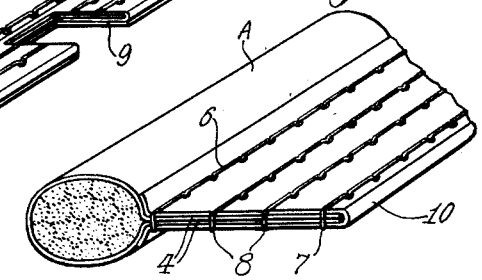
Inventor:
EDWARD J. WIRFS JR.,
His Attorney.

Patented Jan. 31, 1928.

1,657,733

UNITED STATES PATENT OFFICE.

EDWARD J. WIRFS, JR., OF GLENDALE, MISSOURI, ASSIGNOR TO E. J. WIRFS ORGANIZATION, INC., OF ST. LOUIS, MISSOURI, A CORPORATION OF MISSOURI.

GASKET.

Application filed November 8, 1926. Serial No. 147,078.

This invention relates to gaskets of the character adapted for use as packing around refrigerator doors, as a weatherstrip for doors, windows, etc., and for various other uses where a seal is required.

One of the objects of this invention is to provide a gasket in which a roll of soft fibrous material is closely confined by an envelope of flexible waterproof fabric which is extended to provide a tacking lap, but in which the tacking lap is reinforced and secured in a simple and effective manner.

Another object is to provide a gasket of the character described which is simple in construction, effective in its action, neat in appearance, durable and economical to manufacture.

Further objects will appear from the detail description taken in connection with the accompanying drawing in which Figure 1 is a section through a door and its jamb illustrating the application of the gasket embodying this invention.

Figure 2 is a view showing the method of applying such a gasket when turning corners.

Figure 3 is a perspective view showing one embodiment of this invention.

Figures 4 and 5 are similar views showing other embodiments of this invention.

Referring to the accompanying drawing and more particularly to Figure 1, A designates a gasket which is arranged for placement between the door B and the jamb C, as for instance is used in a refrigerator. The gasket has a tacking lap D through which fasteners, such as tacks 1 may be passed to apply the same.

Referring to Figure 3, the gasket comprises a roll 2 of soft fibrous material such as cotton, and enclosed by an envelope 3 of flexible waterproof material such as rubberized cotton. In Figure 3 both free edges of the envelope are extended, as shown at 4, to provide a tacking lap, and an inside line of stitches 6 passes through the fabric plies along the roll and is adapted to closely confine the same in order to provide a tight but yielding packing which will freely yield to form an effective seal and when pressure is relieved will return to a circular shape. A fabric reinforcement 10 is doubled over the tacking lap, in this specific embodiment, one of the plies of the tacking lap, so that one of the plies of this reinforcement will lie between two plies of the tacking lap; preferably also the inside edge of the reinforcement is enclosed within and is secured at its edge by the inside line of stitches 6. A line of stitches 7 passes through the fabric plies along the outer edge of the tacking lap in order to close the same as well as to stiffen the structure and prevent buckling. Additional stitches 8 pass through the fabric plies between the lines of stitches 6 and 7 so as to additionally reinforce the lap and prevent buckling.

In Figure 4 one of the plies of the tacking lap is extended only sufficient as to be included within the line of stitches 6 while both edges of the reinforcement 10 are included within and secured by that line of stitches 6. In Figure 5 both fabric plies 4 are extended the full width of the tacking lap and both edges of the reinforcement 10 are included within and secured by the inside line of stitches 6.

In the application of this gasket the fasteners 1 pierce the tacking lap and secure the gasket in place and in view of the fact that this tacking lap is reinforced by the fabric reinforcement 10 as well as by the lines of stitches, not only will this tacking lap be stiffened transversely but also longitudinally, so that not only is buckling prevented but the tacking lap will be strengthened in its own plane. This is of particular advantage in view of the fact that the securing fasteners are applied only at intervals so that the reinforcement of the tacking lap between the fasteners is of particular utility. In turning corners, as shown in Figure 2, the tacking lap is cut or notched, as shown at 9, Figure 3, so as to permit such a turning and the lapped portions can then be secured by a fastener, as shown in Figure 2. The provision of the inside line of stitches 6 not only permits the notching to be accomplished while still retaining the roll tight at the point of turning but the additional stitches, more particularly the stitches 8, prevent buckling and maintain the tacking lap flat and tight. By employing a reinforcement and more especially a folded reinforcement, which is a separate piece of fabric applied and folded over the tacking lap, not only can the same be more readily applied, but crimping and buckling of the reinforced tacking lap is avoided so that the desired reinforced but flat tacking lap is secured. The construction shown in Figure 4 is particularly applicable for smaller packing where the tacking lap should not be too thick; for a comparatively thin but strong tacking lap is secured by the provision of the stitches along the tacking lap which reinforce as well as stiffen the same. The construction shown in Figures 3 and 5 are particularly applicable to larger gaskets where the tacking lap can be more substantial and is preferably so in order to provide for additional strength as well as stiffness.

It is obvious that various other changes may be made in the details of construction without departing from the spirit of this invention; it is, therefore, to be understood that this invention is not to be limited to the specific details shown and described.

Having thus described the invention what is claimed is:

1. A gasket comprising, a roll of soft fibrous material, an envelope of flexible waterproof fabric enclosing said roll and extended to provide a tacking lap, an inside line of stitches passing through the fabric plies along said roll and adapted to confine the same in order to provide a tight but yielding packing, and a separate fabric reenforcement doubled over said tacking lap and having one of its edges secured by the inside line of stitches.

2. A gasket comprising, a roll of soft fibrous material, an envelope of flexible waterproof fabric enclosing said roll and extended to provide a tacking lap, an inside line of stitches passing through the fabric plies along said roll and adapted to confine the same in order to provide a tight but yielding packing, and a separate fabric reinforcement doubled over said tacking lap and having both of its edges secured by the inside line of stitches.

3. A gasket comprising, a roll of soft fibrous material, an envelope of flexible waterproof fabric enclosing said roll and extended to provide a tacking lap, an inside line of stitches passing through the fabric plies along said roll and adapted to confine the same in order to provide a tight but yielding packing, a separate fabric reinforcement doubled over said tacking lap, a line of stitches passing through the fabric plies along the outer edge of the tacking lap and means securing the fabric plies between the lines of stitches adapted to reinforce the tacking lap.

4. A gasket comprising, a roll of soft fibrous material, an envelope of flexible waterproof fabric enclosing said roll and extended to provide a tacking lap, an inside line of stitches passing through the fabric plies along said roll and adapted to confine the same in order to provide a tight but yielding packing, a separate fabric reinforcement doubled over said tacking lap, a line of stitches passing through the fabric plies along the outer edge of the tacking lap and stitches passing through the fabric plies between the lines of stitches substantially as and for the purpose set forth.

5. A gasket comprising, a roll of soft fibrous material, an envelope of flexible waterproof fabric enclosing said roll and extended to provide a tacking lap, an inside line of stitches passing through the fabric plies along said roll and adapted to confine the same in order to provide a tight but yielding packing, and a separate strip of fabric secured over said tacking lap to reinforce the same.

In testimony whereof I affix my signature this 4th day of October, 1926.

EDWARD J. WIRFS, Jr.